Oct. 24, 1950     T. G. MAY     2,527,367
HATCH COVER Filed March 28, 1945     6 Sheets-Sheet 1

INVENTOR
THOMAS GEORGE MAY
BY Fraser, Myers & Manley
ATTORNEYS

Oct. 24, 1950      T. G. MAY      2,527,367
HATCH COVER Filed March 28, 1945      6 Sheets-Sheet 2

INVENTOR
THOMAS GEORGE MAY
BY Fraser, Myers & Manley
ATTORNEYS

Oct. 24, 1950        T. G. MAY        2,527,367

HATCH COVER

Filed March 28, 1945        6 Sheets-Sheet 3

INVENTOR
THOMAS GEORGE MAY
BY Fraser, Myers & Manley
ATTORNEYS

Oct. 24, 1950  T. G. MAY  2,527,367
HATCH COVER

Filed March 28, 1945  6 Sheets-Sheet 5

INVENTOR
THOMAS GEORGE MAY
BY Fraser, Myers & Manley
ATTORNEYS

Oct. 24, 1950     T. G. MAY     2,527,367
HATCH COVER Filed March 28, 1945     6 Sheets-Sheet 6

INVENTOR
THOMAS GEORGE MAY
BY Fraser, Myers & Manley
ATTORNEYS

Patented Oct. 24, 1950

2,527,367

UNITED STATES PATENT OFFICE 2,527,367

HATCH COVER

Thomas George May, New York, N. Y.

Application March 28, 1945, Serial No. 585,270

9 Claims. (Cl. 114—202)

1

The present invention relates to improvements in hatch covers and is more particularly directed to means by which relatively heavy hatch cover sections may be easily handled. For convenience, the hatch cover sections will sometimes hereinafter be referred to merely as "covers."

The problem and its solution

In vessels in which cargo is stowed in holds for transportation, the hatch covers, in order to be strong enough to withstand the strain of seas washing over them or the weight of articles resting thereon, ordinarily are of rather heavy construction and of considerable weight. This presents a serious handling problem, for in many cases in present practice, the covers must be lifted into place in the hatch or removed therefrom by a derrick operated by a power driven winch, involving excessive labor and other costs in operating the winch and handling the tackle.

Efforts have heretofore been made to provide for manual handling, but these efforts have invariably led to cumbersome devices, such as, for example, mobile jacks, arranged adjacent the hatch for lifting the covers from the hatch and carrying them to positions upon the deck of the vessel. Such devices occupy considerable space, are awkward and expensive to operate, particularly from the standpoint of labor costs, and the covers when not in covering position in the hatch, occupy space, upon the deck of the ship, which could be utilized to advantage for other purposes.

The present invention in providing an effective solution to the stated problem, proceeds upon the theory that the covers need seldom, if ever, be actually removed from the hatch, and that they may be substantially hollow and carry easily operable means to cooperate with the hatch framing and enable them to be rolled or slid easily to the ends of the hatch and there stowed in non-horizontal positions in which they occupy little hatch space and leave the hatch substantially open for the passage of cargo therethrough.

In the preferred form of the invention, rollers are disposed upon opposite ends of the covers on a common axis coincident with the center of gravity of the cover. The rollers support the cover when it is being shifted and work in tracks at opposite sides of the hatch so that the cover may easily be rolled from an intermediate position in the hatch to either end thereof. Because of the fact that the rollers support the cover at its center of gravity, the cover may be tilted, almost without effort, so that the covers are easily stowed in vertical positions at one or both ends

2 of the hatch or, if desired, one or more of the covers may be tilted to vertical positions at intermediate points in the hatch as where only a small hatch opening is needed for small pieces of cargo being handled.

The invention also includes guiding devices and operating means therefor, for preventing the covers from canting and jamming against the hatch frame while being rolled therealong in horizontal position, and locking means and operating means therefor, for locking the covers in their horizontal or covering positions or in their vertical or stowed positions. The locking means, preferably, are adapted to relieve the rollers of the weight of the covers when holding them locked in their covering positions.

Illustrative embodiments of the invention

After becoming acquainted with the foregoing predominant principles employed in this invention, an understanding of suitable means for applying those principles may be gathered from the following specification and the accompanying drawings, in which—

Fig. 7 is a vertical sectional view taken lengthwise of a cover substantially on the line 7—7 of Fig. 1, showing means by which locking mechanisms at opposite ends of a cover may be interconnected for operation in unison.

Fig. 10 is a side elevational view of a special wrench for operating the locking means shown in Fig. 8.

Figs. 11 and 12 are fragmentary plan views of a cover showing the manner of using the mentioned special wrench.

*General features common to both illustrative embodiments*

Figure 1:
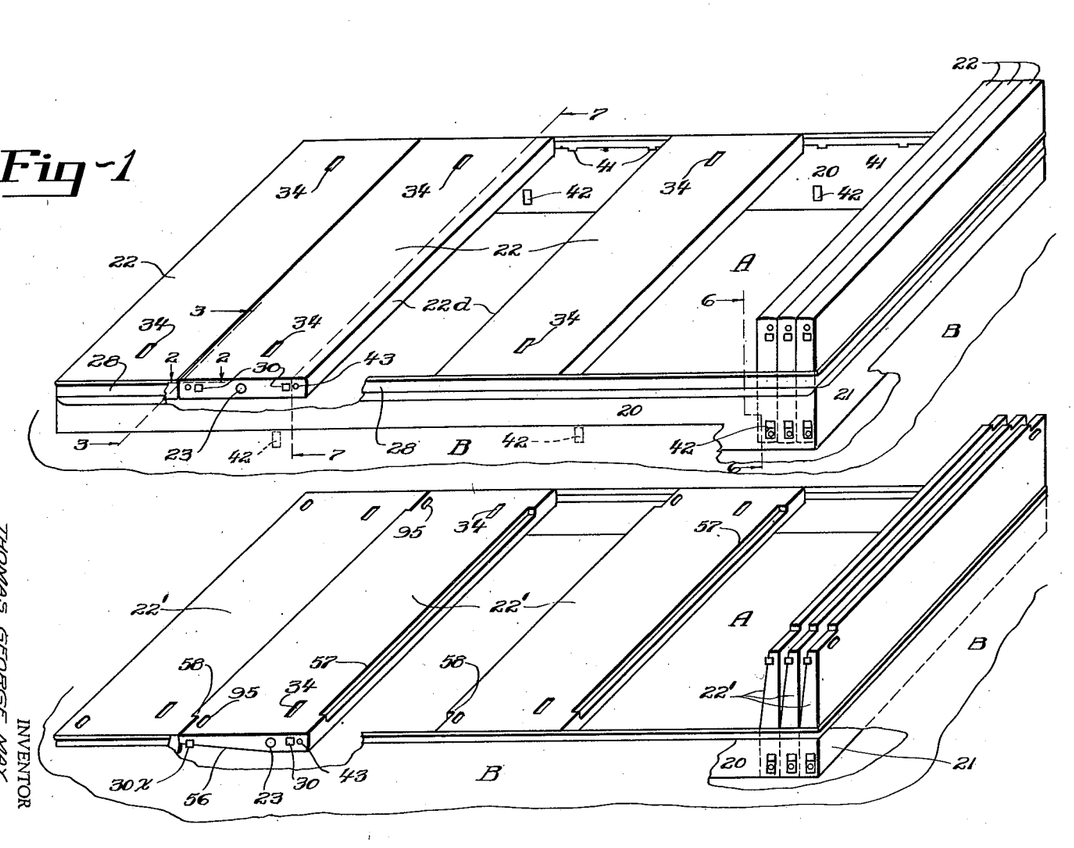
Figure 1 is a combined perspective view of a hatch cover assembly, according to the present invention, in a main deck hatch and in a 'tween deck hatch of a single hold of a vessel.

A hatch of the character referred to herein comprises an opening A, in a deck B, framed by side coaming plates 20 and end coaming plates 21, all as best seen in Fig. 1.

The means for covering the hatch comprise a plurality of covers 22, usually considerably elongated in shape and of sufficient width and number to completely fill in the hatch opening. The covers 22, preferably, are substantially hollow, having, as best seen in Figs. 2–5, a top 22a, bottom 22b, ends 22c (sometimes referred to herein and in the accompanying claims as "sides"), and somewhat rounded sides 22d, best seen in Fig. 1. These parts are all rigidly secured together as by welding or riveting, and to assure sufficient rigidity, strengthening ribs 22e (Fig. 6) are preferably provided, extending longitudinally of the cover, and, in addition, suitable lateral strengthening ribs (not shown) may be provided.

Figure 4:
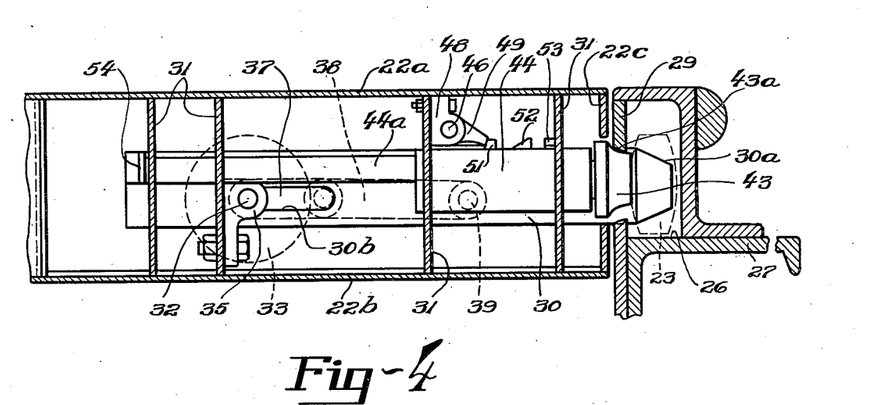
Fig. 4 is a vertical section similar to Fig. 3 except that the locking and guiding means are in the fully extended positions shown in Fig. 2.
Figure 5:
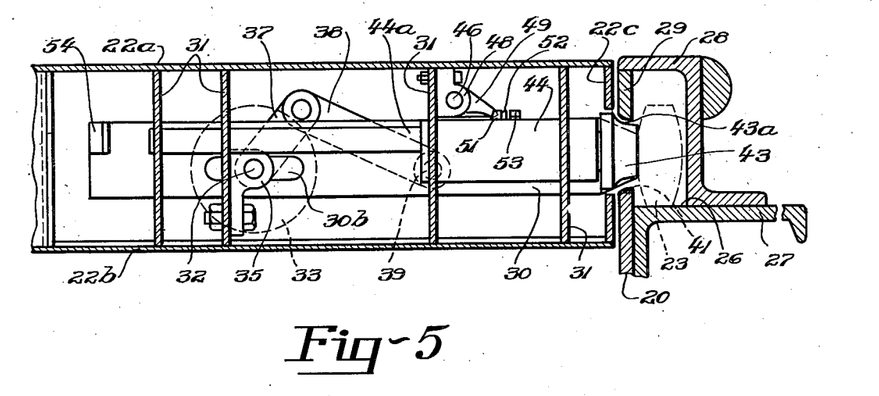
Fig. 5 is a vertical sectional view similar to Figs. 3 and 4; the locking and guiding means being in semi-retracted positions.
Figure 6:
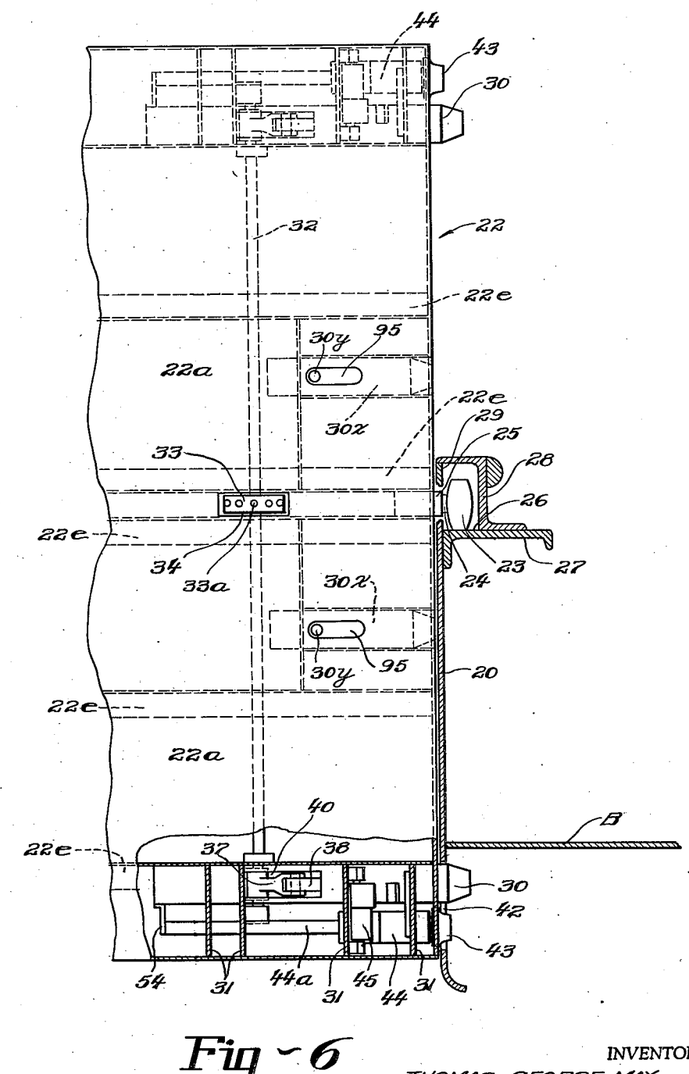
Fig. 6 is a view partly in elevation and partly in vertical section on the line 6—6 of Fig. 1; showing one end of a cover associated with adjacent portions of a hatch and locked in vertical position within the latter.

The covers 22, as a rule, are disposed crosswise of the ship, and, according to a preferred embodiment of the present invention, illustrated in Figs. 1–7, they are of a length approximating but slightly less than the inside width of the hatch. As best seen in Fig. 6, each cover is provided at each end thereof with a shoe, which is illustrated as being in the form of a roller 23, turning upon a stub shaft 24, which is fixed into the end of the cover, preferably within a reinforcing portion 25 suitably mounted within the cover. The stub shafts 24, at opposite ends of each cover, have a common axis which preferably extends substantially through the center of gravity of the cover so that the covers may be turned very easily by hand from their horizontal or covering positions, as shown toward the left side of Fig. 1, to their vertical or non-covering positions, as shown toward the right side of that figure.

The rollers 23, preferably, are arranged to roll on tracks 26 at opposite sides of the hatch, these tracks being the upper surfaces of longitudinal strengthening ribs 27 which, ordinarily, are riveted or otherwise firmly secured to the outer sides of the coaming plates 20. The tracks 26 are preferably enclosed by longitudinal Z-bars 28, suitably fixed upon the ribs 27, and having a supplemental inner depending flange 29, fixed to the inner side thereof, as by welding or otherwise, substantially to enclose the rollers and thus prevent unintentional displacement of the rollers from their tracks.

The covers 22, preferably, are held in either their covering positions or their non-covering positions by sliding bolts 30 (best seen in Figs. 2 to 6). These bolts are located toward opposite corners of opposite sides or ends of the cover and are adapted to slide into suitably located notches 41 in the upper edges of the coaming plates 20 to lock the covers in their covering positions, and into apertures 42, near the bottom of the coaming plates 20 (Fig. 1) to lock the covers in non-covering or stowed positions. These bolts preferably, are tapered at their outer ends, as at 30a, to facilitate their entry into the notches 41 and the apertures 42. They may be slidably mounted to work within suitable openings in the ends of the cover and in bearer plates 31, fixed within the cover. The bearer plates may serve also as strengthening webs, augmenting the rigidity of the cover.

Although the sliding bolts 30 may be of any cross-section, nevertheless, in the embodiments illustrated herein, they are hollow and substantially square in cross-section. They may be substantially hollow, with suitable reinforcing means therewithin to enable them to withstand all stresses and wear incident to their operation. As it is important that the covers 22 have no operating parts exteriorly thereof, the bolts 30 and mechanisms for operating them are entirely within the covers except when extended to perform their locking functions, hereinafter described.

*The preferred embodiment—locking mechanism*

The locking mechanism, in the preferred embodiment, may best be understood by reference to Figs. 2–6, wherein the operating mechanism is designed to operate two locking bolts 30 located toward opposite corners at one end of a cover. This is accomplished, as shown in Fig. 6, by providing a suitably supported single shaft 32 extending laterally of the cover, not far removed from one end thereof, and preferably having a small capstan wheel 33, keyed to the shaft near the center thereof, in position to register with openings 34 and 34a in the top and bottom of the cover as shown in Fig. 7. These openings afford access to permit a capstan bar to be inserted into holes 33a in the capstan wheel, to turn the shaft 32. The openings 34, 34a, preferably, are no larger than necessary for the indicated purpose, and more particularly the length of each such opening is so restricted that the rotation of the shaft 32, through the use of a capstan bar in any one of the holes 33a, is limited to half the rotation needed to shift the bolt 30 completely from either to the other of its extreme positions.

As best seen in Fig. 6, each of the two bolt mechanisms, at one end of a cover, differ only in being of reverse or opposite design. The shaft 32 is operatively connected to each of said bolts and operates each of them in precisely the same manner, hence, the following description of the structure of the operating means and of the operation of one of the bolts 30 should suffice for both.

As best seen in Figs. 2–5, one end of the shaft 32 extends through a vertical web of a strengthening rib 22e, thence through similar slots 30b in opposite sides of the bolt 30, terminating in a bearing 35 suitably fixed upon one of the bearer plates 31. A bearing 36, preferably, is also provided where the shaft passes through the web of the strengthening rib 22e. Fixed upon the shaft 32, within the sliding bolt 30, and constrained to turn with the shaft, is a lever 37 to the free end of which a link 38 is pivotally connected. The link 38, also is pivotally connected to the bolt 30 by a pin 39 (Figs. 3–5) extending laterally of the bolt, at a point between the slot 30b and the outer end of the bolt. In order to permit movement of the lever 37 and the link 38 to upwardly-extending positions, as, for example, those shown in Figs. 3 and 5, the bolt 30 is provided with a slot 40 in the top thereof (Fig. 2), through which the said lever and link may protrude when the mechanism is operated.

Figure 3:
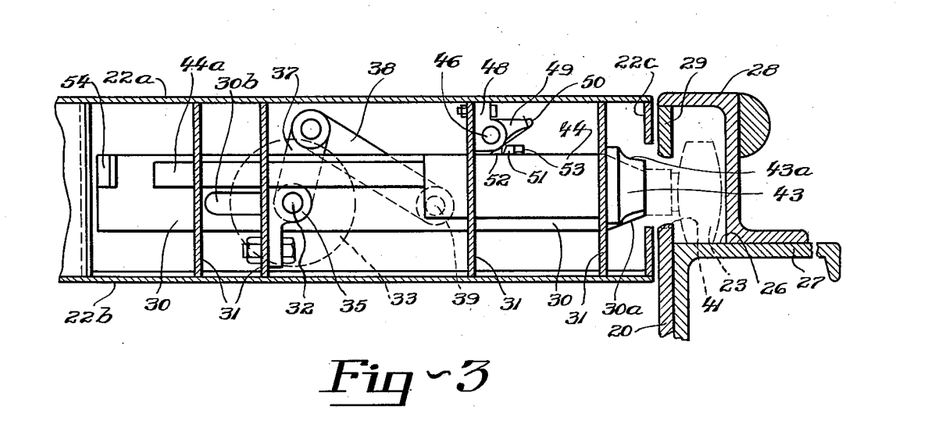
Fig. 3 is a vertical sectional view substantially on the lines 3—3 of Figs. 1 and 2; the locking means and guiding means being in fully retracted positions, and the position of a supporting roller, in the background, being indicated in broken lines.

Rotation of the capstan wheel 33 clockwisely as viewed in Fig. 3, turns the shaft 32 to move the lever 37 and link 38 to their positions indicated in Fig. 4, thereby moving the bolt 30 from its fully retracted position, as in Fig. 3, to its fully extended position as in Fig. 4. Rotation of the wheel 33, in the opposite direction, moves the bolt to its fully retracted position. When the bolt 30 is in its fully retracted position, or in is semi-retracted position as in Fig. 5, the cover is supported entirely by the rollers 23.

The locking mechanism, is adapted, not only to lock the covers in position, but also to relieve the rollers of the weight of the cover when the latter is in horizontal position to close the hatch. For the latter purpose, the notches 41 are of such depth that as a bolt 30 is moved from its retracted position to its extended position, the tapered surfaces 30a, on the underside of the outer end of the bolt, engages the bottom surface of the notch 41 and causes the bolt to ride up onto the said surface, thus raising the bolt and the cover slightly, to take the weight of the latter off the rollers 23. The lift thus imparted to the bolt and the cover may be perceived by a comparison of Figs. 3 and 5 with Fig. 4. In the latter figure a slight clearance is shown underneath the roller 23 but it may occur in practice that the lift would be so slight that it would be taken up in tolerances within the bearing of the roller to relieve the weight of the cover therefrom while, nevertheless, leaving the roller in contact with the track 26.

*The preferred embodiment—guiding mechanism*

It is intended that the covers 22 be adapted for rolling, on the rollers 23, along the tracks 26 from an intermediate point of the hatch to a point near the end thereof, assuming, of course, that the bolts 30 are in retracted positions. While a cover, as thus far described, could be so manipulated, nevertheless, as it is supported substantially at its center of gravity, it would be very unstable and awkward to handle; and if it were desired to roll the cover along the hatchway while in its horizontal position, its tendency to skew would cause diagonally opposite corners of the cover to jam against the adjacent surfaces of the hatch frame and thus interfere with the horizontal movement of the cover. In order to afford stability for the cover during horizontal movement within the hatch and to prevent such jamming, guide means are provided, preferably in the form of flanged guide wheels 43, securely mounted for rotation upon the outer ends of mounting blocks 44, arranged to slide within suitable openings in the ends 22c of the cover, toward the corners thereof, and in the several bearer plates 31. The guide wheels 43 turn on suitable axles which are fixed to the blocks 44 in any suitable manner. The block 44 preferably has an extension 44a at its inner end.

The guide wheel 43 is shown in its inactive or retracted position in Fig. 3; and by sliding the block 44, which carries it, the guide wheel may be extended sufficiently to cause its curved surface 43a to coact with the lower rounded horizontal surface of the flange 29 or with the upper rounded horizontal surface of the coaming plate 20. Although the space between the two last mentioned horizontal surfaces in relation to the proportions of the guide wheel 43, is sufficient to permit a slight rocking motion of the cover, that motion is not objectionable. If desired, however, the space between the mentioned horizontal surfaces could be made narrower or the guide wheels 43 could be somewhat enlarged, to keep that tilting motion at a minimum.

It may be seen that if the guide wheels 43, toward the two corners at one side of the cover, are extended as in Fig. 4, the cover may be rolled along the hatch while being maintained substantially in its horizontal position and the said guide wheels, coacting with the coaming plate and with the depending flange 29, prevent the hatch cover from skewing, and thus prevent jamming of the cover.

*The preferred embodiment—interrelationship of locking and guiding mechanisms*

The blocks 44, and the guide wheels carried thereby, are operated by the bolts 30, but, as the desired amplitude of movement, of the block 44, is only about half that of the bolt 30, a lost motion connection is provided between the two. This connection is such that, during the movement of the bolt 30 from its innermost position it coacts with and moves the block 44. Conversely, during inward or retraction movement of the bolt 30 there is a somewhat similar coaction to retract the block 44 and the guide wheel carried thereby.

The means by which the bolt 30 actuates the block 44 and the guide wheels 43, may best be understood from Figs. 2–5, from which it may be observed that a pawl 45 is supported by a pin 46 carried within bearings 47, 48, bolted or otherwise firmly secured to an upper portion of one of the bearer plates 31 so that a locking portion 49 of the pawl overlies the block 44 and a release portion 50 of the pawl overlies the bolt 30. A locking dog 51, preferably, is formed integrally with the block 44 to extend laterally across the top thereof; a beveled release dog 52 is fixed to or formed integrally upon the top of the bolt 30; and an actuating finger 53 is fixed to the top of the bolt 30 and extends laterally from the latter to overlie the block 44, as may best be understood by a comparison of the mentioned parts as they appear in Figs. 2, 4 and 5.

The coaction of the bolt 30 and the block 44, carrying the guide wheel 43, may best be understood by observing that when the said parts are in their retracted positions as shown in Fig. 3, the release dog 52 is coacting with the release portion 50 of the pawl 45 to hold the locking portion 49 of said pawl in its indicated raised position, and the block 44 is held in its retracted position by the actuating finger 53, which is in engagement with the locking dog 51.

Figure 2:
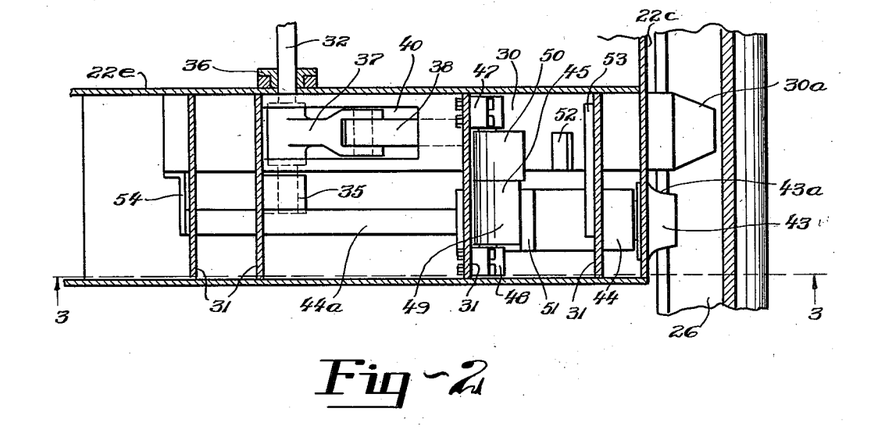
Fig. 2 is a sectional plan view of one corner of a hatch cover according to a preferred embodiment of the invention, taken substantially on the line 2—2 of Fig. 1, the top of the cover being removed to show certain locking means and guiding means associated therewith; both said means being in fully extended positions in which they coact with frame portions of a hatch.

Assuming that the shaft 32 is turned clockwisely, the bolt 30 moves outwardly in the manner already explained, and at an intermediate point in such movement a laterally extending actuating finger 54, fixed to the inner end of the bolt 30 as best understood from Figs. 2 and 3, engages the extension 44a of the mounting block 44 so that, with continued outward movement of the bolt 30, the block 44 and the guide wheel 43 carried thereby are moved outwardly until they reach their fully extended positions indicated in Figs. 2 and 4. Two distinct operations of the capstan wheel 33, utilizing two different holes 33a therein, are required to move the bolt 30 from fully retracted to fully extended position. When the bolt 30 and the wheel 43 are fully extended, the locking portion 49 of the pawl drops into position in back of the locking dog 51 (Fig. 4), thus preventing unintended retraction of the wheel 43.

To fully retract a bolt 30, two distinct reverse operations of the capstan wheel 33 are needed. In each of these capstan wheel operations, a separate hole 33a is utilized, and the rotation of the capstan wheel in each operation, is confined to the limited range of rotation afforded a capstan bar by the openings 34, 34a. As a result of the first operation of the capstan wheel, the bolt 30 is retracted to the extent indicated in Fig. 5, leaving the locking portion 49 of the pawl in locking engagement with the locking dog 51 on the block 44, so that, without further operation of the capstan wheel, the guide wheel 43 is securely held in its fully extended position to function for guiding purposes in the manner already described, while the bolt 30, as may be seen from Fig. 5, is sufficiently retracted that it no longer engages the notch 41, so that the cover may be moved freely along the hatchway. In this condition, also, the beveled surface of the release dog 52 is just about to engage the release portion 50 of the pawl 45, and the actuating finger 53 is still at a distance from the locking dog 51.

Assuming now that it is desired to fully retract both the bolt 30 and the guide wheel 43 so that the hatch cover may be rotated freely between its horizontal or covering position and its non-horizontal or non-covering position, the capstan wheel 33 is again rotated counterclockwisely, causing the bolt 30 to move inwardly. During the first part of this further inward movement of the bolt, the beveled release dog 52 slides underneath the release portion 50 of the pawl, thereby rotating the latter and lifting the locking portion 49, of the pawl, clear of the locking dog 51. The parts are so designed and arranged that just about as the locking portion 49 is lifted clear of the locking dog 51, the actuating finger 53, in its movement toward the left, engages the locking dog 51, causing the block 44, and the guide wheel 43 thereon, to move toward the left, with the bolt 30, to their fully retracted positions shown in Fig. 3.

Obviously the bolt 30 and the guide wheel 43 at one corner of the cover may be operated independently of similar parts at another corner of the cover, but the provision of common operating means, as described, for those parts at both corners of one end of a cover should greatly facilitate operations. There may likewise be some advantage in interconnecting the means for operating the bolts 30 and the guide wheels 43 at opposite ends of a cover. Although this may be done in various ways within the present invention, nevertheless one simple and effective way of interconnecting such mechanisms is disclosed in Fig. 7, and resides in the provision of a link 55, the ends of which are pivotally connected eccentrically to the capstan wheels 33 located toward opposite ends of the cover, the connections being such that retracting or extending rotation of either of said wheels compels corresponding retracting or extending rotation of the other wheel.

*Operation of preferred embodiment*

Having described the various parts of a hatchway and cover, according to the disclosed preferred embodiment, and the manner in which those various parts individually operate, it should be helpful to consider the complete operation of such covers in actual practice.

Referring to the main deck hatchway illustrated at the top of Fig. 1, let it be assumed that all six covers 22 shown therein are in horizontal or covering positions, completely closing the hatchway, and that it is desired to open the hatch. Probably the best way to do this is to shift those covers so that three of them will be in their vertical or stowed positions, indicated in Fig. 1, at the right end of the hatch, and the other three will be similarly stowed at the left end of the hatch, thus opening the latter so that cargo may be removed from or put into the hold of the ship. For present purposes, it may also be assumed that all the covers include all the various structures illustrated in Figs. 2-7, and that, at the commencement of this operation, the various bolts 30 and the rollers 43 are in their fully extended positions.

A workman, using a suitable capstan bar inserted through an opening 34, in a cover at one end of the hatchway, turns the capstan wheel counterclockwisely, as viewed in Fig. 4, through two turning stages, to fully retract the bolts 30 and guide wheels 43 at all four corners of the cover, after which, by hand, the cover is very easily tilted to a substantially vertical position and rolled, on its rollers 23, a short distance to the near end of the hatch.

Then, again using the capstan bar, the capstan wheel 33 in the next cover is turned counterclockwisely; but this time, in a single turning stage, to retract the bolts 30 partially, to a sufficient extent to clear their related notches 41 while leaving the guide wheels 43 fully extended for guide purposes, as shown in Fig. 5. That cover, still in its mentioned horizontal position, is then rolled on its rollers 23, while guided by its guide wheels 43, to a position close to the first stowed cover. Then, the capstan wheel is given a second stage of rotation counterclockwisely, to fully retract the several bolts 30 and the guide wheels 43, permitting that cover to be tilted to a vertical position and rolled further to bring it into intimate face to face relation to the first stowed cover.

The third cover is then handled and stowed similarly to the second cover, after which the capstan wheel of the third cover is turned through two clockwise turning stages, thereby fully extending the bolts 30, so that one of said bolts at each end of the cover and the related guide wheels 43 enter apertures 42, to lock the third cover into vertical position. This has the effect, also, of holding the first and second covers in vertical positions between the third cover and the adjacent end coaming plate 21. Then, the three remaining covers may similarly be handled and stowed at the other end of the hatch.

When it is desired to shift the several covers again, to their horizontal positions, to close the hatch, the locking bolts are first retracted in the innermost cover stowed a one end of the hatch, then that cover is rolled a short distance in the direction of the center of the hatch, after which it is tilted back to horizontal position and its wheel 33 is operated to bring the guide wheels 43 to their guiding positions, as shown in Fig. 5. Then, that cover is rolled on its rollers 23, guided by its guide wheels 43, to its proper position in the hatch, after which, by further operation of its wheel 33, the bolts 30 may be fully extended into engagement with the notches 41 to lift the cover slightly, to take its weight off the rollers 23, and to hold it securely in its horizontal or covering position. The next cover, at that end of the hatch, is then handled in the same way to move and lock it into covering position, except that the operation of unlocking it from stowed position is not necessary. The endmost cover at that end is then merely rolled slightly toward the adjacent cover and tilted and locked in covering position. The covers at the other end of the hatch are then handled in the same manner.

It is apparent, of course, that in stowing or unstowing the various covers, and particularly in locking or unlocking them when they are in vertical position, it may occur, on some occasions, that only the top of a cover would be accessible for operating the capstan wheel 33, while, on other occasions, only the bottom of a cover would be accessible for that purpose. It is for this reason that the openings 34 and 34a in the top and bottom of the cover are provided.

If desired, the covers may be locked individually in their stowed positions, plural apertures 42 being provided and suitably located for that purpose. On occasions, also, as where small pieces of cargo are being handled, it may be desired to tilt less than all the covers to non-covering positions, and to stow and lock them at points intermediate the ends of the latch. For this purpose, apertures 42 may be provided in the coaming plates 20 at intermediate points in the hatch.

Obviously, if desired, several workmen could work together in the performance of the described operations so that stowage of covers toward opposite ends of the hatchway could progress simultaneously.

*An embodiment of the invention in 'tween deck hatch covers*

Hatch covers for 'tween deck hatches may embody much the same principles as those just described. However, as the coaming plates, framing 'tween deck hatches, ordinarily, are not as deep as at the main deck hatches, it may be desirable to provide covers which, in their vertical positions, do not extend materially below the lower edges of the coaming plates.

An application of the invention to 'tween deck hatches is shown in the lower portion of Fig. 1, from which it may be seen that the several covers 22' may be tapered somewhat as at 56, toward one of the long sides thereof. The effect of this is to shift the center of gravity toward the other side of the cover. The rollers 23 are placed nearer to the thicker or untapered side of the hatch cover so that their axes will be substantially coincident with the center of gravity of the cover section. This assures easy handling of the covers, and, if the thicker side of each cover is tilted downwardly, in stowing, the covers, usually, would not extend below the coaming plates.

In the illustrated 'tween decks hatch cover arrangement, a rabbet 57 is formed along the top of the thicker side of each of the covers and a complementally shaped tongue 58 is formed along the top of the thinner or tapered side thereof, the arrangement being such that the tongue on one cover will seat and fit within the rabbet of the next adjacent cover, except that the tongue 58, of one of the end covers, rests upon the adjacent end coaming plate 21, to derive partial support therefrom. In this way each cover, excepting a cover at one end of the hatch, contributes to the support of an adjacent cover, and the cover at the other end of the hatch is partially supported by the adjacent coaming plate.

Locking and guiding means may be provided for such 'tween deck hatch covers similar to such means illustrated in Figs. 2 to 5 inclusive, including both the bolts 30 and the rollers 43 and the mechanism for operating those parts. In the 'tween deck cover sections, however, the locking and guiding means of the character illustrated in Figs. 2-5 may be located only in the corners at each end of the thicker side of the cover. This arrangement may be adopted for two reasons; first, because of the fact that the described flange and rabbet construction aids in providing support at the tapered side of the cover; and second, because the tapered side ordinarily would not have sufficient space therein to accommodate the mentioned locking and guiding means.

The tongue 58, on a cover, and the rabbet 57 on the adjacent cover may be so designed that, when the bolts 30 are extended, they function in the notches 41 to rotate the cover very slightly, counter-clockwisely (as viewed in Fig. 1) to raise the cover slightly and thus relieve the rollers 23 of the weight of the cover. The locking and guiding means which are provided at the ends of the thicker side of the cover may advantageously be interconnected for operation in unison according to the structure disclosed in Fig. 7.

*Second embodiment—locking mechanism*

A second embodiment of the invention is illustrated in Figs. 8-12. This embodiment utilizes the principle of a sliding locking bolt having a tapered outer end, adapted to lock a cover either in covering or non-covering position and, in moving to covering position, to raise the cover slightly to relieve the rollers 23 of the weight of the cover; also, the principle of utilizing guide wheels to prevent jamming of the cover against the hatch framing when the cover, in a horizontal attitude, is being moved horizontally along the hatch. The second embodiment differs from the described preferred embodiment chiefly in that the locking and guiding means are individually operated and in the details of their structures and operating means.

Figures 8, 8A, 9:
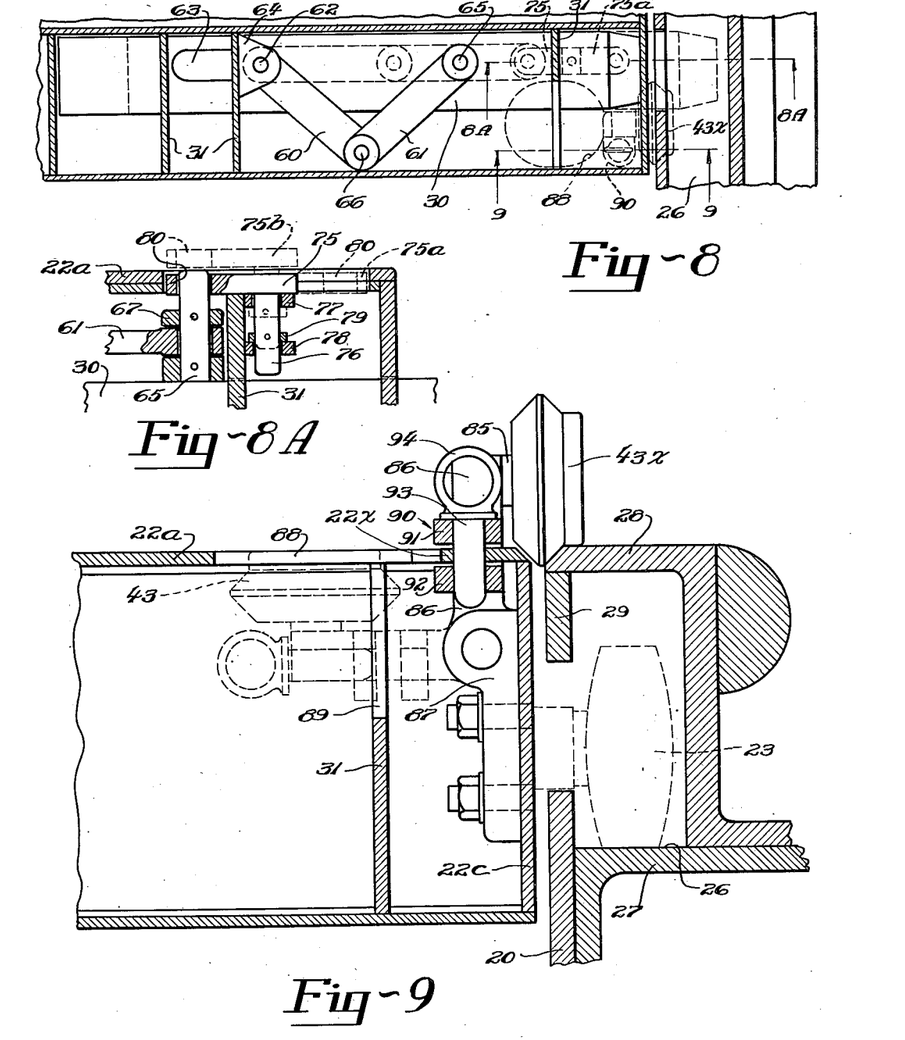
Fig. 8 is a plan view somewhat similar to Fig. 2, but showing another embodiment of locking and guiding means according to this invention.
Fig. 8A is an enlarged fragmentary vertical sectional view taken substantially on the line 8A—8A of Fig. 8.
Fig. 9 is an enlarged fragmentary vertical section substantially on the line 9—9 of Fig. 8, the locking means of Fig. 8 being omitted for clearness, and the position of a supporting roller, in the background, being indicated in broken lines.

In the second embodiment, as may best be understood from Fig. 8, the sliding bolt 30, mounted within the cover, is actuated by toggle links 60, 61, which overlie the bolt 30, and are interconnected pivotally by a pin 66. The former link is pivotally mounted, by a pin 62, to a lug 64 suitably fixed to a bearer plate 31 at a point above the bolt 30. The end of the toggle link 61, remote from the link 60, is pivotally connected to the bolt 30 by a vertical pin 65 fixed into said bolt. If desired, the mentioned toggle link arrangement may be duplicated at the underside of the bolt 30.

The pin 65, as best shown in Fig. 8A, is arranged to extend upwardly clear of the link 61, and above a fastening collar 67, to a point substantially coincident with the plane of the outer surface of the top 22a of the cover, and the pin 66 likewise extends substantially to the mentioned plane, so that each of said pins has a cylindrical head. The bolt 30 is moved from its retracted position shown in full lines in Fig. 8, to its extended position, shown therein in broken lines, by moving the toggle links 60, 61, from their collapsed condition, shown in full lines, to their straightened or fully extended position, shown in broken lines.

In this movement, the pin 66 moves in an arc centered at the pin 62, while the pin 65 moves in a straight line with the bolt 30. To render the heads of the pins 66 and 65 accessible for the purpose of operating the toggle links to reciprocate the bolt, an arcuate slot 68 and a straight slot 69 (Figs. 11, 12) are provided in the top 22a of the hatch cover, located coincidentally with the arcuate and straight lines of movement of the mentioned pins. The heads of the pins 66 and 65 extend into and slide within the slots 68 and 69, respectively, and are of less diameter than the width of said slots, to an extent sufficient to enable the mentioned heads to receive sockets 70, 71, of a specially designed hand wrench 72, shown in Fig. 10.

The wrench 72 is used to operate the bolt 30, in a manner best understood by reference to Figs. 11 and 12. Assuming that the bolt 30 is fully retracted, and that, with the cover in horizontal position, it is desired to extend the bolt into a notch 41 to lock the cover in that position, the wrench 72 is placed so that the socket 71 engages the head of the pin 65, as shown in Fig. 11. Then, being grasped at its handle 73, the wrench is pulled in a straight line coinciding with the length of the slot 69, as indicated by the arrow, until the links 60, 61 assume the positions shown in Fig. 12.

At that time, increased resistance to the pull is encountered, because of the fact that the beveled surface at the outer end of the bolt 30 then first engages the bottom surface of the notch 41, in the same manner as those surfaces interengaged at an intermediate point, in the outward movement of the bolt 30, in the described preferred embodiment. Upon this resistance being encountered, the wrench is repositioned, so that the socket 70 engages the head of the pin 66, and a lug 74, on the wrench, extends downwardly into the slot 69 at a point inwardly of the head of the pin 65. Then, the wrench is turned clockwisely, as indicated by the arrow thereon, in Fig. 12, until the toggle links 60, 61 are straightened and the bolt 30 fully extended. This two-stage operation of the toggle links 60, 61, by the wrench 72, to actuate the bolt 30, corresponds somewhat to the two-stage operation of the capstan wheel 33 in the described preferred embodiment.

To retract the bolt 30, when the cover is locked in covering position, the socket 70 and the lug 74 may be placed in engagement with the head of the pin 66 and with the slot 69, respectively, after which the wrench may be turned counterclockwisely to partially collapse the toggle links. Then, the socket 71 of the wrench may be placed upon the head of the pin 65, and the wrench then used to push the latter pin inwardly within the slot 69 to completely collapse the toggle links and completely retract the bolt 30.

If desired, the wrench may be used as a lever, in cooperation with the pin 66 and the slot 69, to accomplish the entire extension or the entire withdrawal of the bolt 30, when the cover is in its horizontal position.

When the cover is in vertical or non-covering position, the wrench 72, being long enough for the purpose, may be conveniently manipulated by a workman standing upon the deck alongside the hatch. When it is desired to lock the cover in vertical position, socket 71 may be placed upon the head of the pin 66 and pulled upwardly. Although such a pull would not be in a direct line with the arcuate movement of the pin 66, nevertheless, it is near enough in line thereto for present purposes, and a normal manual pull would be of sufficient force to straighten the toggle links 60, 61 and thereby extend the bolt 30 to a locking position.

It may be understood that, because of the fact that the bolt 30 need not function to lift the weight of the cover from the rollers 23, when locking the cover in non-covering or stowed position, the operation does not require the mechanical advantage incident to using the wrench 72 as a lever, as described in connection with the operation of locking the cover in its covering position. In order to unlock the cover from its stowed position, the workman using the wrench, need only push the pin 66 downwardly to its limit of movement.

Means are provided for holding the toggle links 60, 61 in their straightened relation to keep the bolt 30 locked in extended position, such means being best illustrated in Figs. 8 and 8A. They comprise a locking link 75, having a downwardly extending pin 76 toward one end thereof, by which it is pivotally mounted within vertically spaced lugs 77, 78, suitably secured to a bearer plate 31. The pin 76 is vertically slidable within said lugs but is secured against displacement therefrom by a collar 79, of less thickness than the space between the lugs 77 and 78 and pinned or otherwise secured to a point on the pin 76 between the two lugs. This permits vertical movement of the pin 76 and corresponding vertical movement of the locking link 75 between its full line and broken line vertical positions, as shown in Fig. 8A.

The locking link 75 also is provided, at its end remote from the pin 76, with a circular aperture 80, slightly greater in diameter than the diameter of the head of the pin 65. The locking link 75, in plan view as best seen in broken lines in Fig. 8, is of a width slightly less than the width of the slot 69 in the top 22a of the cover section, the said slot being extended sufficiently to accomodate the locking link 75 in two different positions therein, as hereinafter explained.

The locking link 75, when not being used for locking purposes, preferably is disposed in its position indicated in broken lines at 75a in Figs. 8 and 8A. However, when the toggle links 60, 61 have been straightened and it is desired to hold them straightened to keep the bolt 30 locked in its extended position, the locking link 75 may be slid upwardly upon its pin 76, to bring that link completely above the outside plane of the top 22a of the cover. Then, the link may be rotated, about the axis of the pin 76, to the position thereof indicated in broken lines at 75b in Fig. 8A, after which it may be dropped again into the slot 69, with the aperture 80 embracing the head of the pin 65, thereby locking the toggle links 60, 61, so that the bolt 30 may not, unintendedly, shift from its locking position. The reverse operation of the locking link 75, of course, serves to unlock the toggle links 60, 61, so that the bolt 30 may be retracted.

According to the second embodiment, no provision is shown for interconnecting the bolt operating means at different corners of the cover, nor for utilizing the bolt operating means for operating any guiding means.

*Second embodiment—guiding means*

The second embodiment, as ilustrated, may include means for guiding the covers against jamming when they, in horizontal position, are being moved horizontally in the hatch. The mentioned guiding means comprise separate guide wheels 43x, preferably mounted within the covers, near the corners thereof. One of such wheels and its mounting is shown in Figs. 8 and 9, from which it may be seen that the wheel 43x is rotatably mounted upon a stub shaft 85, fixed upon the upper end of a stem 86, which is pivotally mounted at its lower end upon a mounting lug 87, suitably fixed to the inner side of an end 22c of the cover.

The pivotal mounting of the stem 86 is such that the wheel 43x and the stem 86, carrying that wheel, may be pivoted from inoperative position, as shown in broken lines in Fig. 9, in which position the said parts are entirely within the planes of the outer surfaces of a hatch cover, to operative positions, indicated in full lines, in which the wheel 43x and a portion of the stem 86 extend exteriorly of the cover in position for the wheel to coact with the Z-bar 28 to guide the cover against jamming during horizontal movement within the hatch.

The cover top 22a is cut away, as at 88, and the bearer plate 31, which is shown in Fig. 9, is also cut away, as at 89, to permit unobstructed swiveling of the wheel 43x between its operative and inoperative positions.

The stem 86 preferably has a bifurcated lug 90 formed on one side thereof, having spaced fingers 91, 92, respectively adapted, when the wheel 43x is in raised or operative position, to overlie and underlie a portion 22x of the cover top 22a. There is also provided a pin 93 having a finger grip 94. This pin may be placed into registering holes in the finger 91, the portion 22x, and the finger 92, all as best shown in Fig. 9, whereby to lock the stem 86, and thereby prevent unintended shifting of the guide wheel 43x from its operative position.

When it is desired to pivot the wheel 43x from its operative position to its inoperative position, within the cover, the pin 93 may be manually withdrawn and after the stem 86 and the wheel carried thereby have been pivoted downwardly sufficiently that the fingers 91 and 92 are clear of the portion 22x, the pin 93 may then be manually placed back into the apertures in the fingers 91 and 92, within which they are proportioned to have a fairly tight sliding fit. In this way the pin 93 is retained against possible loss. The stem 86 and the wheel 43x may then be pushed all the way into their inoperative positions within the hatch cover. From the foregoing it will be seen that each guide wheel 43x is individually manipulated, and that two or more guide wheels 43x may coact with each other or with rollers 23, to prevent jamming of the cover.

*General observations*

It will be readily understood from the foregoing that the present invention provides shoes or rollers adapted to support a hatch cover at opposite sides or ends for rotation from a horizontal or covering position to a vertical or stowed position, and for moving the cover horizontally within the hatchway and stowing it within the hatch, either at intermediate points or at one or both opposite ends thereof. The invention will also be seen to embody simple, inexpensive, easily operated means for locking a hatch cover in either covering or stowed positions and also for preventing jamming of the cover when it, in horizontal position, is being moved horizontally within the hatchway. The broad result is that, by means of the present invention, hatch covers may be more easily and economically handled than heretofore and may be advantageously stowed in positions wherein they occupy no deck space and hence render the deck space more fully available for other purposes.

In connection with any of the disclosed embodiments and variations of the invention, auxiliary slide bolts may be provided for giving added support to the covers when they are in covering position. Such auxiliary bolts may be located at intermediate points at the ends of a cover as shown at 30x in Fig. 6, or toward a corner, at the ends of the covers as at 30x in Fig. 1.

The auxiliary bolts 30x should work easily as they need not impart any lift to the cover, but may be moved to locking position, within suitably located notches 41 in the coaming plates 20, after the main bolts 30 have lifted the weight of the cover from the rollers 23. For this reason, each of the auxiliary bolts 30x need only be provided with a pin 30y (Fig. 6), fixed thereto and extending upwardly into a straight slot 95 formed in the top 22a of the cover. The slot 95 is only long enough to permit the desired extension and retraction of the bolt 30x and is wide enough to permit the socket 71 of the wrench 72 to be placed over the pin 30y which extends only to the plane of the top surface of the cover. By means of the wrench, the bolts 30x may easily be operated.

Obviously the present inventive concept may be embodied in various structures other than those used as illustrative embodiments in the present application, without, however, departing from the invention as defined in the following claims.

What I claim is:

1. A hatch cover comprising a body, means protruding from opposite sides of said body for supporting the cover pivotally within a hatchway, and adapted to facilitate rotational movement and horizontal movement of the cover relatively to the hatchway, means for locking the cover against any such movements, and means for guiding the cover, in such horizontal movement, whereby to prevent jamming of the cover in the hatchway, the said locking and guiding means being extensible from the cover for so locking and guiding the latter and retractable to permit such pivotal movement, the locking and guiding means having common operating means adapted to operate the two said means substantially in unison.

2. A hatch cover comprising a body, means protruding from opposite sides of said body for supporting the cover pivotally within a hatchway, and adapted to facilitate rotational movement and horizontal movement of the cover relatively to the hatchway, means for locking the cover against any such movements, and means for guiding the cover, in such horizontal movement, whereby to prevent jamming of the cover in the hatchway, the said locking and guiding means being extensible from the cover for so locking and guiding the latter and retractable to permit such pivotal movement, the locking means having an operating mechanism and the guide means being adapted to coact with the locking means to derive extension and retraction movement therefrom.

3. A hatch cover comprising a body having supporting means for supporting it movably within a hatch, and locking means carried by the cover for locking the latter against movement within the hatch, the locking means comprising a bolt, slidably mounted within the body and adapted to slide outwardly to protrude therefrom into locking position in locking engagement with an adjacent hatch portion, and a lever, mounted within the body and pivotally connected to said bolt, for operating the latter; the lever being accessible for operation from the exterior of the body, the lever comprising a capstan wheel, as one arm thereof, and another arm, rigidly connected, radially, to said wheel and having its free end pivotally connected to the bolt, the body having an aperture in the cover, adjacent the periphery of the wheel, adapted for the insertion of a capstan bar therethrough into peripheral holes in the wheel, and for angular movement of such a bar in the said aperture to rotate the wheel.

4. A hatch cover comprising a body, having protruding pivotal shoes, at opposite sides thereof, substantially coincident with the cover's center of gravity, for supporting the cover for pivotal and horizontal movements within the hatchway; locking bolts slidably mounted within the cover and adapted to be slid to the exterior thereof at said opposite sides and at each side of said shoes; guide wheels and slidable mountings therefor, carried within the cover and slidable in substantial parallelism to said bolts, adapting the wheels to be shifted to the exterior of the cover at plural points along said opposite sides of the cover; and operating means for extending and retracting said bolts, the said wheel mountings and bolts having coacting protruding portions, extending across common lines of movement, and adapted, when the bolts are extended and retracted, to interengage and cause the wheels to be extended and retracted with the bolts.

5. A hatch cover having a locking bolt and a guide wheel mounting, both slidably carried in adjacent parallel sliding positions within the cover, operating means operatively connected to said bolt for sliding the latter to and from a locking position thereof, the wheel mounting and the bolt having interengageable portions constraining the wheel mounting to slide in response to sliding movement of the bolt, a pawl, arranged to engage the wheel mounting to hold the latter in its fully extended position, and a pawl lifter, carried by the bolt, and arranged to coact with said pawl, during retractive movement of the bolt, to release the pawl from engagement with the wheel mounting whereby to permit retractive movement of the wheel mounting in response to further retractive movement of the bolt.

6. A hatch cover having a body, a first supporting member protruding from said cover for supporting the latter, a second supporting member slidably mounted within the body and adapted to slide from therewithin to an extended position wherein it protrudes from the cover for cover-supporting coaction with an adjacent hatch portion, toggle links connected between the said second supporting member and the body, the links being in collapsed condition when the latter member is fully retracted into the body and in substantially straight-line condition when the latter member is fully extended.

7. A hatch cover according to claim 6, the toggle links having connecting means adapted to receive a tool for shifting the links between their two mentioned conditions.

8. A hatch cover having a body, a locking bolt slidably mounted within the body and adapted to slide from therewithin to an extended position wherein it protrudes from the cover for locking coaction with an adjacent hatch portion, toggle links connected between the bolt and the body, the links being in collapsed condition when the bolt is fully retracted into the body and in substantially straight-line condition when the bolt is fully extended, the body of the cover being partially cut away to afford access to the toggle links for shifting the latter between their two mentioned conditions, further including a pin in said bolt, and a manually operable locking link, pivotally mounted on the cover and having a recess formed therein which, in one pivotal position of the link, engages said pin to hold the bolt in its fully extended position.

9. A hatch closure comprising plural similar covers, each of said covers being tapered toward one side thereof and having supporting means at each end for supporting it pivotally at the cover's center of gravity, the side opposite the tapered side having a recess along the top edge thereof and the tapered side having a tongue portion adapted to set within such a recess in the next adjacent cover, the covers each having locking bolts extensible beyond marginal portions of the cover, toward the side opposite the tapered side, said bolts having wedge portions which, when said bolts are extended, coact with an adjacent hatch portion, to lift the cover at said opposite side, giving the cover a slight rotational movement about its tongue portion whereby, at least partially, to relieve the mentioned supporting means of the weight of the cover.

THOMAS GEORGE MAY.

REFERENCES CITED

The following references are of record in the file of this patent:

UNITED STATES PATENTS

| Number | Name | Date |
|---|---|---|
| 255,788 | Howell | Apr. 4, 1882 |
| 294,108 | Ballard | Feb. 26, 1884 |
| 989,702 | Gurney | Apr. 18, 1911 |
| 1,195,763 | Anderson | Aug. 22, 1916 |
| 1,291,633 | Allmon | Jan. 14, 1919 |
| 1,416,683 | Silverman et al. | May 16, 1922 |
| 1,735,329 | MacGregor | Nov. 12, 1929 |
| 2,101,465 | Beers | Dec. 7, 1937 |
| 2,124,970 | Bagley | July 26, 1938 |
| 2,150,763 | Elliott | Mar. 14, 1939 |
| 2,209,060 | Lambert | July 23, 1940 |

FOREIGN PATENTS

| Number | Country | Date |
|---|---|---|
| 16,231 | Norway | Aug. 25, 1906 |
| 257,358 | Great Britain | Sept. 2, 1926 |
| 298,145 | Great Britain | Oct. 1, 1928 |
| 364,474 | Great Britain | Jan. 7, 1932 |
| 383,082 | Great Britain | Nov. 10, 1932 |
| 421,878 | Great Britain | Jan. 1, 1935 |